US010041453B2

(12) United States Patent
Yoshioka et al.

(10) Patent No.: US 10,041,453 B2
(45) Date of Patent: Aug. 7, 2018

(54) APPARATUS FOR HEATING INTAKE SYSTEM FOR ENGINE OF VEHICLE BY HOT WATER

(71) Applicant: AISAN KOGYO KABUSHIKI KAISHA, Obu-shi, Aichi-ken (JP)

(72) Inventors: Mamoru Yoshioka, Nagoya (JP); Minoru Akita, Ama (JP); Tsutomu Kuniyoshi, Tokai (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 177 days.

(21) Appl. No.: 15/045,768

(22) Filed: Feb. 17, 2016

(65) Prior Publication Data
US 2016/0237959 A1  Aug. 18, 2016

(30) Foreign Application Priority Data

Feb. 17, 2015 (JP) ................. 2015-028911

(51) Int. Cl.
*F02M 15/00* (2006.01)
*F02M 31/04* (2006.01)
*F02M 31/10* (2006.01)
*F02D 33/02* (2006.01)

(52) U.S. Cl.
CPC ........... *F02M 31/042* (2013.01); *F02D 33/02* (2013.01); *F02M 31/10* (2013.01); *Y02T 10/126* (2013.01)

(58) Field of Classification Search
CPC ...... F02M 31/042; F02M 31/10; F02D 33/02; Y02T 10/126

USPC ......................................... 123/556
See application file for complete search history.

(56) References Cited

U.S. PATENT DOCUMENTS

| | | | | |
|---|---|---|---|---|
| 4,168,681 A * | 9/1979 | Kawai | ...................... | F02M 1/14 |
| | | | | 123/198 DB |
| 4,433,665 A * | 2/1984 | Abe | ......................... | F02M 1/10 |
| | | | | 123/179.15 |
| 5,655,506 A * | 8/1997 | Hollis | ....................... | F01P 3/20 |
| | | | | 123/556 |
| 6,293,262 B1 * | 9/2001 | Craig | .................. | F02B 29/0418 |
| | | | | 123/542 |
| 2001/0013332 A1 * | 8/2001 | Torii | ...................... | F02M 15/02 |
| | | | | 123/337 |

(Continued)

FOREIGN PATENT DOCUMENTS

| | | |
|---|---|---|
| JP | S58-53845 U | 4/1983 |
| JP | S59-206682 A | 11/1984 |
| JP | H07-77108 A | 3/1995 |

*Primary Examiner* — Marguerite McMahon
(74) *Attorney, Agent, or Firm* — Oliff PLC

(57) ABSTRACT

In an apparatus for heating an intake system for an engine of a vehicle by hot water, the vehicle having an engine compartment placed in a front part, in which a radiator is placed on a front side, and the engine and the intake system are placed behind the radiator. The intake system includes an intake passage and a throttle device. A hot water passage is provided to circulate hot water around the throttle device to heat the throttle device, the hot water having been warmed by cooling the engine. In the hot water passage, a hot water control valve is provided. In the hot water control valve, an expanding-contracting member made of shape-memory alloy is provided to control opening and closing of the hot water control valve in response to the internal temperature of the engine compartment.

8 Claims, 12 Drawing Sheets

(56) References Cited

U.S. PATENT DOCUMENTS

2002/0023510 A1* 2/2002 Miyazaki ............... F16H 61/12
  74/335
2015/0268102 A1* 9/2015 Miyata .................. G01K 13/02
  702/50

* cited by examiner

41: ENGINE COMPARTMENT TEMP. SENSOR
42: IAT SENSOR
43: WATER TEMP. SENSOR
44: THROTTLE TEMP. SENSOR
45: OAT SENSOR

APPARATUS FOR HEATING INTAKE SYSTEM FOR ENGINE OF VEHICLE BY HOT WATER

CROSS-REFERENCE TO RELATED APPLICATIONS

This application is based upon and claims the benefit of priority from each of the prior Japanese Patent Application No. 2015-028911 filed on Feb. 17, 2015, the entire contents of which are incorporated herein by reference.

BACKGROUND OF THE INVENTION

Field of the Invention

The present invention relates to a vehicle engine placed, together with a radiator and an intake system, in an engine compartment of a vehicle and more particularly to an apparatus for heating an intake system for an engine of a vehicle with hot or warm water, the engine being configured such that various accessory devices provided in relation to an intake system are heated by circulation of cooling water or coolant (hot water) heated or warmed by cooling the engine.

Related Art

As the above type of technique, conventionally, there has been known an air control device disclosed in for example Japanese unexamined patent application publication No. 7-77108(1995) (JP-A-7-77108(1995)). In an engine, generally, outside or ambient air is directly taken into a combustion chamber through an intake passage. In cold areas, therefore, cold outside air is directly drawn into an intake passage and may cause freezing of various accessory devices provided in the intake passage. Herein, examples of the accessory devices provided in the intake passage may include a throttle valve, a mixer located before a compressor of a supercharger, and others. In even an engine provided with an EGR device, water or moisture in EGR gas flowing therein through the EGR passage may freeze near the throttle valve. Conventional accessory devices are therefore configured to circulate cooling water (hot water), which has been heated or warmed by cooling the engine, to heat the accessory devices to prevent their freezing. The device described in JP-A-7-77108(1995) is configured such that a throttle shaft and its surrounding parts as well as the throttle valve are warmed together by the hot water. It is herein conceived that a flow of the hot water to heat the accessory devices is controlled by opening and closing a hot water control valve provided in a hot water passage. This hot water control valve is also conceivably controlled according to the temperature of the hot water or the temperature of each of the heated accessory devices.

SUMMARY OF INVENTION

Problem to be Solved by the Invention

However, in the device described in JP-A-7-77108(1995), the accessory device is placed away from the engine which is a heat source for the hot water. When opening/closing of the hot water control valve is controlled at the temperature of the accessory device, hunting may occur during the control. For instance, when the temperature of the accessory device becomes low to some degree during engine start-up, the hot water control valve is opened, allowing hot water to flow in the hot water passage, thereby warming the accessory device. Thus, the temperature of the accessory device rises. When this temperature exceeds a predetermined value (a high temperature), the hot water control valve is closed, thus shutting off the flow of hot water in the hot water passage. Thereafter, as the accessory device is cooled by running wind in association with running of the vehicle, the temperature of the accessory device decreases. When this temperature becomes lower than a predetermined value (a low temperature), the hot water control valve is opened again to flow hot water, so that the accessory device is warmed. In this manner, the hot water control valve is frequently opened and closed according to changes in temperature of the accessory device. Accordingly, the temperature of the accessory device cannot be stably adjusted.

The present invention has been made in view of the circumstances and has a purpose to provide an apparatus for heating an intake system for an engine of a vehicle by hot water, capable of stably heating as needed an accessory device provided in an intake system by using hot water warmed by cooling an engine.

Means of Solving the Problem

To achieve the above purpose, one aspect of the invention provides an apparatus for heating an intake system for an engine of a vehicle by hot water, the vehicle having an engine compartment placed in a front part, in which a radiator is placed on a front side, and the engine and the intake system are placed behind the radiator, wherein the intake system includes an intake passage to introduce air into the engine and an accessory device provided in connection with the intake passage, and the apparatus comprises: a hot water passage configured to allow hot water warmed by cooling the engine to circulate around the accessory device to heat the accessory device; a hot water control valve configured to control a flow of the hot water in the hot water passage; and a control unit configured to control the hot water control valve to open and close according to an internal temperature of the engine compartment.

Effects of the Invention

According to the present invention, it is possible to stably heat as needed an accessory device provided in an intake system by hot water warmed by cooling an engine without causing hunting.

DESCRIPTION OF EMBODIMENTS

First Embodiment

A detailed description of a first embodiment of an apparatus for heating an intake system for an engine of a vehicle by hot water (also referred to as an "intake-system hot water heating apparatus of a vehicle engine"), embodying the present invention will now be given referring to the accompanying drawings.

Figure 1:
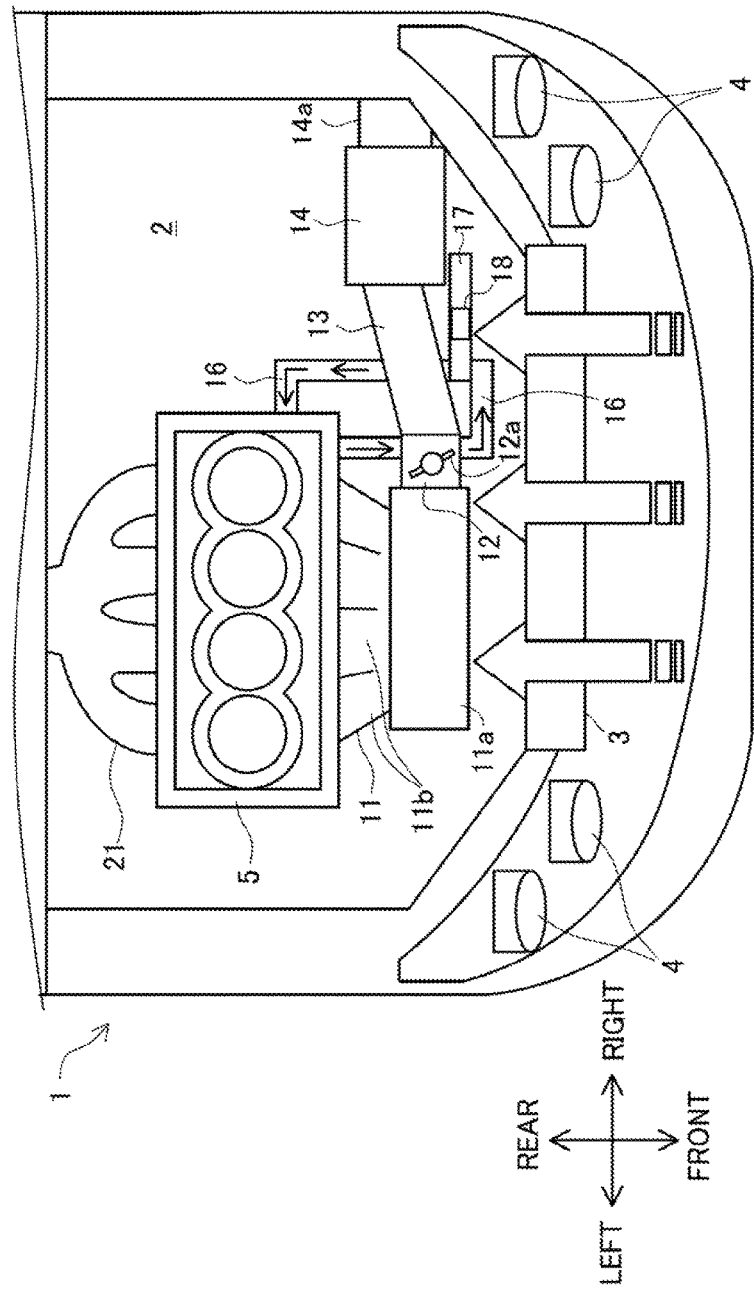
FIG. 1 is a plan view schematically showing a vehicle front part, from which a bonnet has been removed, in a first embodiment.
Figure 2:
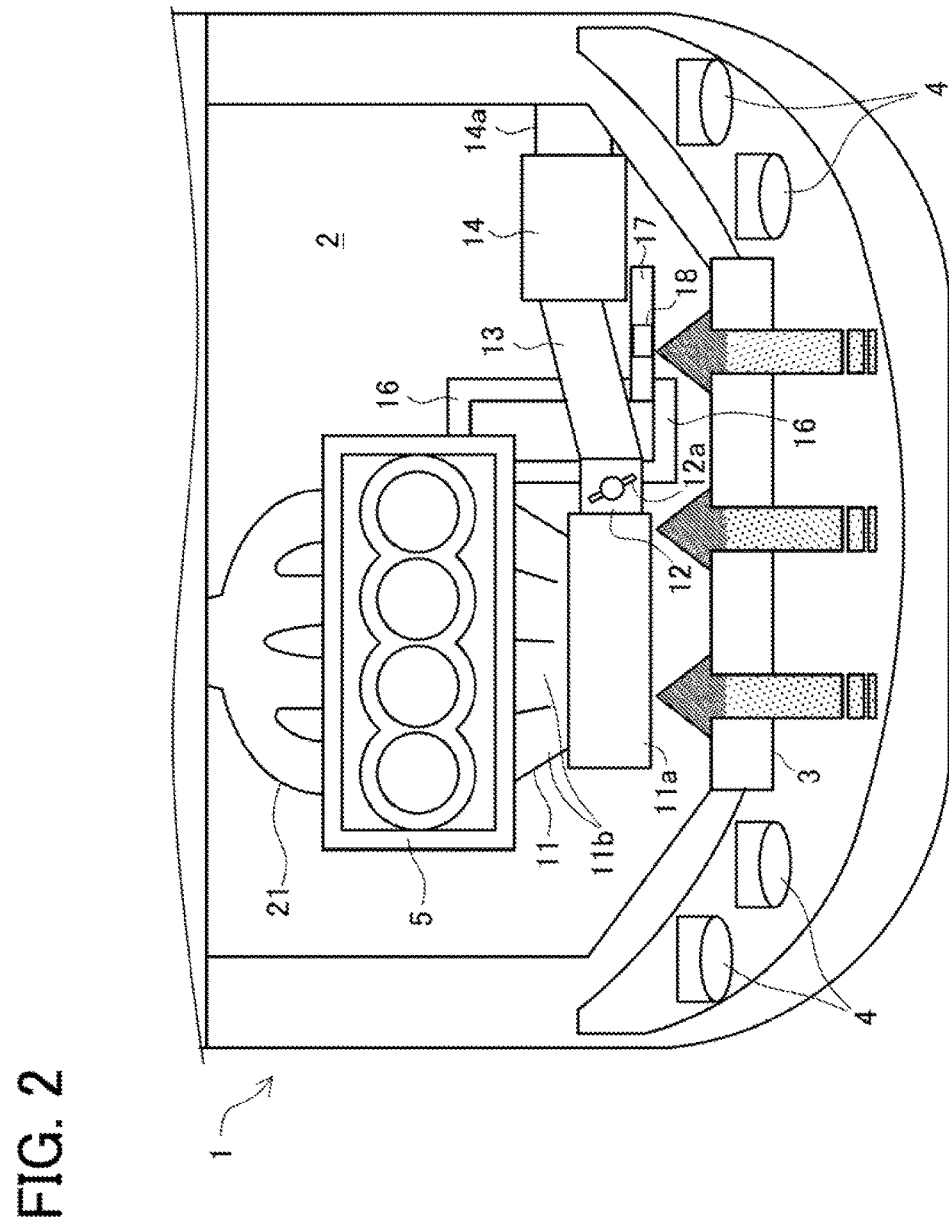
FIG. 2 is another plan view schematically showing the vehicle front part, from which the bonnet has been removed, in the first embodiment.

FIGS. 1 and 2 are plan view schematically showing a front part of a vehicle 1 from which a bonnet has been removed. In FIGS. 1 and 2, the front, rear, right, and left sides of the vehicle 1 are indicated by arrows (the same applies to other figures similar to FIGS. 1 and 2). In FIGS. 1 and 2, thick arrows represent a "flow of air" and show a temperature difference by different patterns in the "shaded" arrows. Specifically, darker shading represents higher temperature (the same applies to other figures similar to FIGS. 1 and 2). In an engine compartment 2 placed in the front part of the vehicle 1, a radiator 3 is placed at the front center to allow the air drawn from the front of the vehicle 1 to flow in the engine compartment 2 by passing through the radiator 3. Behind the radiator 3, an engine 5, and an intake system and an exhaust system of the engine 5 are placed. Herein, the radiator 3 is provided with a cooling water passage (not shown) to circulate cooling water (hot water) for heat exchange, the cooling water (hot water) having been warmed by cooling the engine 5. At start-up of the engine 5 during a cold period, cooling water having been not warmed yet by the engine 5 is likely to flow in the radiator 3. Then, the temperature of the cooling water becomes higher and higher as warm-up of the engine 5 further advances. After completion of warm-up of the engine 5, high-temperature hot water will flow in the radiator 3.

Headlights 4 are arranged on right and left sides of the radiator 3. In the engine compartment 2, the engine 5 is placed sideways. In front of the engine 5, an intake manifold 11 is provided to introduce air into a combustion chamber (not shown). Behind the engine 5, an exhaust manifold 21 is provided to allow exhaust air to flow out of the combustion chamber. A downstream end of the exhaust manifold 21 is connected to a cataract converter for exhaust purification and an exhaust pipe (not shown). The exhaust manifold 21 and others constitute an exhaust passage and an exhaust system.

An inlet of the intake manifold 11 is connected with an intake pipe 13 via a throttle device 12. A leading end of the intake pipe 13 is provided with an air cleaner 14. This air cleaner 14 is provided with an intake inlet 14a. Those intake manifold 11, throttle device 12, intake pipe 13, and air cleaner 14 constitute an intake passage and an intake system of the present invention. The intake passage is configured to introduce air (intake air) into the combustion chamber of the engine 5. The intake manifold 11 includes a surge tank 11a and a plurality of branch pipes 11b. The throttle device 12 includes a throttle valve 12a. This throttle device 12 is fixed to a right end of the surge tank 11a placed sideways. The intake pipe 13 extends rightwards from the throttle device 12 and connects with the air cleaner 14.

In the present embodiment, the throttle device 12 corresponds to an accessory device of the present invention provided in relation to the intake passage. A hot water passage 16 is provided between the engine 5 and the throttle device 12. The hot water passage 16 is arranged to circulate therethrough cooling water (hot water) warmed by cooling the engine 5 to allow the cooling water to flow in the casing of the throttle device 12, i.e., to circulate around the throttle valve 12, in order to heat the throttle device 12. The hot water passage 16 is provided branching from the cooling water passage. At a certain place in the hot water passage 16, a non-electrically operated hot water control valve 17 is provided to control a flow of the hot water. In this hot water control valve 17, an expanding-contracting member 18 is provided to control opening/closing of the hot water control valve 17 according to the temperature of the engine compartment 2. This expanding-contracting member 18 corresponds to a control unit of the present invention.

Figure 3:
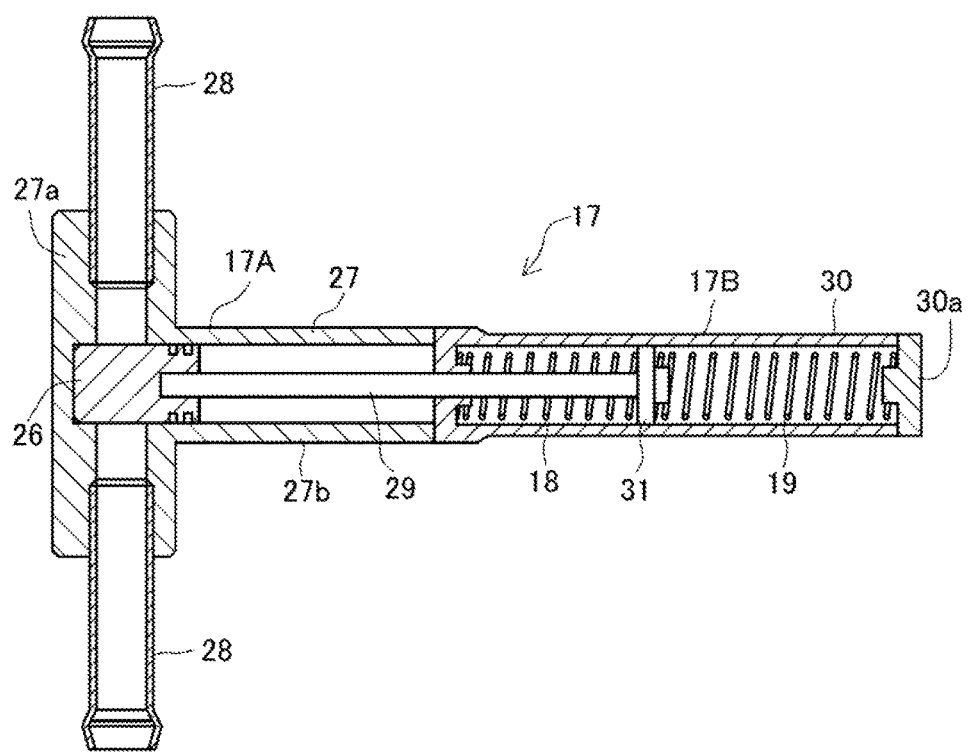
FIG. 3 is a sectional view of a hot water control valve in a valve-closed state in the first embodiment.
Figure 4:
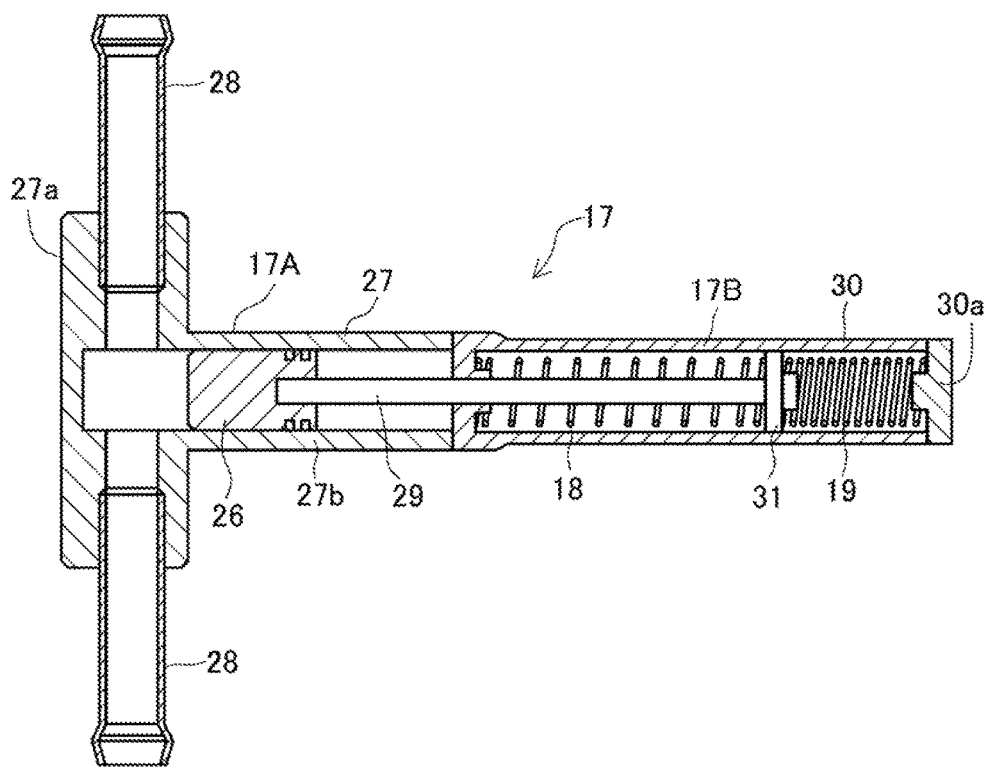
FIG. 4 is a sectional view of the hot water control valve in a valve-open state in the first embodiment.

Next, the structure of the hot water control valve 17 will be explained in detail. FIG. 3 is a sectional view of the hot water control valve 17 in a valve-closed state. FIG. 4 is a sectional view of the hot water control valve 17 in a valve-open state. As shown in FIGS. 3 and 4, the hot water control valve 17 includes a valve part 17A including a valve element 26 to open and close the hot water passage 16, and a drive part 17B to drive this valve element 26.

The valve part 17A is provided with a casing 27 having a nearly T-shape in plan view. This casing 27 includes a hollow passage part 27a and a hollow cylinder part 27b intersecting the passage part 27a. Both ends of the passage part 27a are individually connected with pipe joints 28. These pipe joints 28 are further connected to the hot water passage 16, so that the passage part 27a forms a part of the hot water passage 16. The cylinder part 27b is provided with a valve element 26. This valve element 26 has a nearly columnar shape and is placed to reciprocate between a valve-closed position to block off a passage of the passage part 27a as shown in FIG. 3 and a valve-open position to open the passage part 27a as shown in FIG. 4. The valve element 26 is provided with a valve shaft 29 extending to the drive part 17B.

The drive part 17B is provided with a casing 30 having a cylindrical shape. This casing 30 has a bottom-closed cylindrical shape with an open end (a right end in FIG. 3) sealed by a lid 30a. In this casing 30, the valve shaft 29 extends in an axial direction by penetrating through the bottom of the casing 30. In the casing 30, a disc-shaped flange member 31 is fixed to a leading end portion of the valve shaft 29. This flange member 31 also serves as a heat insulating member having a heat insulating property. As materials of the heat insulating member, for example, ceramic and resin may be used. In the casing 30, further, an expanding-contracting member 18 and a spring 19 are arranged by interposing the flange member 31 therebetween. Specifically, the flange member 31 serving as the heat insulating member is placed between the spring 19 and the expanding-contracting member 18. That is, the expanding-contracting member 18 is provided between the bottom of the casing 30 and the flange member 31. This expanding-contracting member 18 is made of shape-memory alloy formed in a coil shape. The spring 19 is provided between the flange member 31 and the lid 30a. This spring 19 is a component of the drive part 17B. The expanding-contracting member 18 can expand or contract in response to the internal temperature of the engine compartment 2 to control operations of the drive part 17B. Specifically, in a high temperature period where the internal temperature of the engine compartment 2 is high, the expanding-contracting member 18 contracts as shown in FIG. 3 and the flange member 31 is pressed together with the valve shaft 29 by the urging force of the spring 19, thereby disposing the valve element 26 in the valve-closed position. On the other hand, in a low temperature period where the internal temperature of the engine compartment 2 is low, the expanding-contracting member 18 expands as shown in FIG. 4, pressing the flange member 31 together with the valve shaft 29 in an opposite direction against the urging force of the spring 19, thereby disposing the valve element 26 in the valve-open position.

For instance, in FIG. 1, during an outside air low-temperature period where the temperature of outside air falls to the freezing point and after completion of warm-up of the engine 5, the internal temperature of the engine compartment 2 decreases due to the cold running wind passing through the radiator 3 in association with running of the vehicle 1. Thus, the hot water control valve 17 is opened, allowing hot water to flow in the hot water passage 16 as indicated by arrows in FIG. 1 to heat the throttle device 12. On the other hand, during an outside air normal-temperature period where the temperature of outside air is normal and after completion of warm-up of the engine 5, the internal temperature of the engine compartment 2 rises due to the warm running wind passing by passing through the radiator 3 in association with running of the vehicle 1. Accordingly, the hot water control valve 17 is closed, shutting off a flow of the hot water in the hot water passage 16 to stop heating the throttle device 12.

According to the intake-system hot water heating apparatus of a vehicle engine in the present embodiment explained above, in the engine compartment 2 located in the front part of the vehicle 1, the radiator 3 is placed on a front side, and the engine 5 and its intake system, that is, the intake manifold 11, intake pipe 13, air cleaner 14, and throttle device 12 which is an accessory device, are placed behind the radiator 3. During operation of the engine 5, the air having passed through the radiator 3 flows in the engine compartment 2, having a thermal influence on the air in the engine compartment 2. However, the engine compartment 2 is filled with heat (heated air) generated by the engine 5 and thus the internal temperature of the engine compartment 2 relatively slowly changes. Herein, in order to heat the throttle device 12, the hot water warmed by cooling the engine 5 is circulated around the throttle device 12 through the hot water passage 16. Opening and closing of the hot water control valve 17 are controlled by the expanding-contracting member 18 which is the control unit according to the internal temperature of the engine compartment 2, thereby controlling a flow of the hot water in the hot water passage 16. Accordingly, even when the temperature of the air passing through the radiator 3 and flowing in the engine compartment 2 changes, the internal temperature of the engine compartment 2 does not change suddenly and thus the hot water control valve 17 is not frequently switched to open and close. Therefore, the throttle device 12 provided in the intake system can be stably heated as needed by the hot water warmed by cooling the engine 5 without causing hunting.

In the present embodiment, expansion or contraction of the expanding-contracting member 18 caused in response to the internal temperature of the engine compartment 2 controls the operation of the spring 19 which is the drive part, thereby controlling opening and closing of the hot water control valve 17. Consequently, any electrical structure does not need to be provided for opening and closing control of the hot water control valve 17. This can achieve a simplified structure of the hot water heating apparatus.

In the present embodiment, since the expanding-contracting member 18 is made of shape-memory alloy, this expanding-contracting member 18 can be relatively easily installed in the hot water control valve 17 and managed as compared with an expanding-contracting member made of liquid or fluid material. In this regard, producing and managing the hot water control valve 17 can be facilitated.

In the present embodiment, the flange member 31 made up of a heat insulating member is placed between the spring 19 and the expanding-contracting member 18 constituting the drive part. Accordingly, the heat transmitted to the spring 19 is blocked by the flange member 31 and hence is less likely to transfer to the expanding-contracting member 18. This makes it possible to avoid extra thermal influence on the expanding-contracting member 18 and properly control opening and closing of the hot water control valve 17 according to the internal temperature of the engine compartment 2.

Second Embodiment

Next, a second embodiment of the apparatus for heating an intake system for an engine of a vehicle by hot water according to the present invention will be explained in detail, referring to the accompanying drawings.

In the following description, identical or similar components to those in the first embodiment are assigned the same reference signs as those in the first embodiment and their details are not explained. The following explanation is thus given with a focus on differences from the first embodiment.

Figure 5:
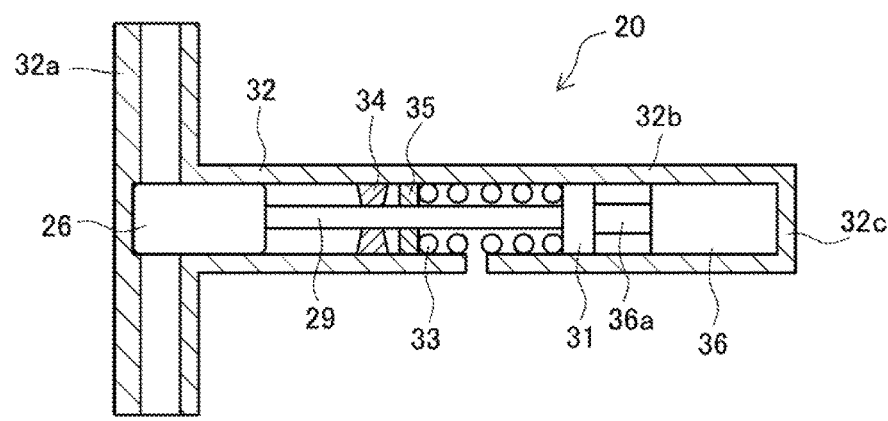
FIG. 5 is a sectional view of a hot water control valve in a valve-closed state in a second embodiment.
Figure 6:
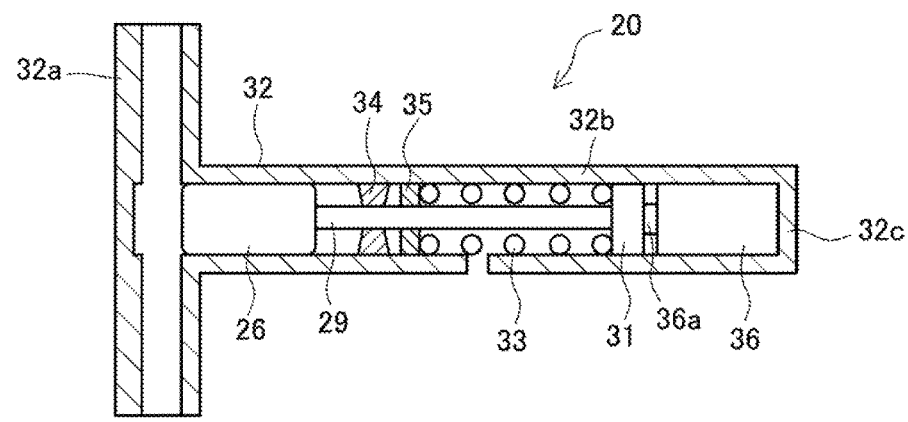
FIG. 6 is a sectional view of the hot water control valve in a valve-open state in the second embodiment.

The second embodiment differs from the first embodiment in that a hot water control valve 20 different in structure from the hot water control valve 17 of the first embodiment is provided instead. FIG. 5 is a sectional view of the hot water control valve 20 in a valve-closed state. FIG. 6 is a sectional view of the hot water control valve 20 in a valve-open state. As shown in FIGS. 5 and 6, this hot water control valve 20 is provided with a casing 32 having a nearly T-shape in plan view. This casing 32 includes a hollow passage part 32a and a hollow cylinder part 32b intersecting the passage part 32a. Both ends of the passage part 32a are connected to the hot water passage 16, so that the passage part 32a forms a part of the hot water passage 16. The cylinder part 32b is provided with the valve element 26 and the valve shaft 29 to open and close the hot water passage 16 and a spring 33 serving as the drive part to drive the valve element 26. The valve element 26 is placed to reciprocate inside the cylinder part 32b between a valve-closed position to block off the passage part 32a as shown in FIG. 5 and a valve-open position to open the passage part 32a as shown in FIG. 6.

In the cylinder part 32b, there are fixedly provided a bearing 34 moveably supporting the valve shaft 29 and a partition wall 35. The valve shaft 29 extends by penetrating through those bearing 34 and partition wall 35. A leading end of the valve shaft 29 is fixed with the disc-shaped flange member 31 also serving as the heat insulating member. In the present embodiment, the spring 33 is placed between the partition wall 35 and the flange member 31. Further, an expanding-contracting member 36 is provided between the flange member 31 and a bottom 32c of the cylinder part 32b. In the present embodiment, the expanding-contracting member 36 is constituted of a "wax thermo-element". As well known, the wax thermo-element internally contains thermo-wax that expands or contracts in response to temperatures and a piston 36a that extends or contracts in association with expansion or contraction of the thermo-wax. This expanding-contracting member 36 can extend or contract in response to the internal temperature of the engine compartment 2 to control operations of the spring 33. Specifically, in a high temperature period, as shown in FIG. 5, the piston 36a of the expanding-contracting member 36 extends, pressing the flange member 31 and the valve shaft 29 against the urging force of the spring 33, thereby disposing the valve element 26 in the valve-closed position. On the other hand, in a low temperature period where the internal temperature of the engine compartment 2 is low, as shown in FIG. 6, the piston 36a of the expanding-contracting member 36 contracts and also the flange member 31 and the spring 33 presses the valve shaft 29 and the flange member 31 in the opposite direction, thereby disposing the valve element 26 in the valve-open position.

According to the intake-system hot water heating apparatus of a vehicle engine in the present embodiment explained above, when the expanding-contracting member 36 made of a wax thermo-element expands (extends), the hot water control valve 20 is closed, thus blocking off the hot water passage 16. When the expanding-contracting member 36 contracts, the hot water control valve 20 is opened, thus opening the hot water passage 16. In this respect, the expanding-contracting member 36 of the present embodiment expands (extends) and contracts to move the valve element 26 to open or close the hot water passage 16 in an opposite manner to the expanding-contracting member 18 of the first embodiment. However, the function of the expanding-contracting member 36 to control opening/closing of the hot water control valve 20 is equivalent to that of the expanding-contracting member 18, so that the present embodiment can achieve the same operations and advantages as the first embodiment.

Third Embodiment

Next, a third embodiment of the apparatus for heating an intake system for an engine of a vehicle by hot water according to the present invention will be explained in detail, referring to the accompanying drawings.

Figure 7:
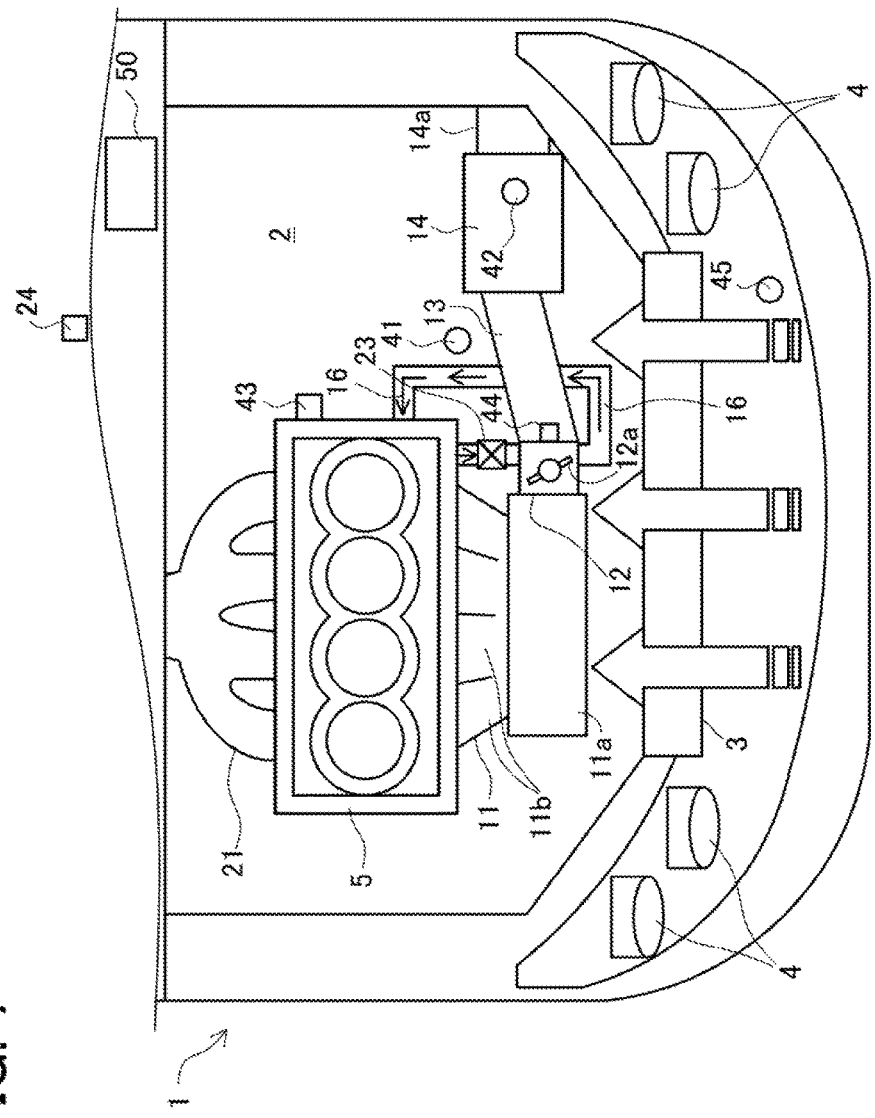
FIG. 7 is a plan view schematically showing a vehicle front part, from which a bonnet has been removed, in a third embodiment.
Figure 8:
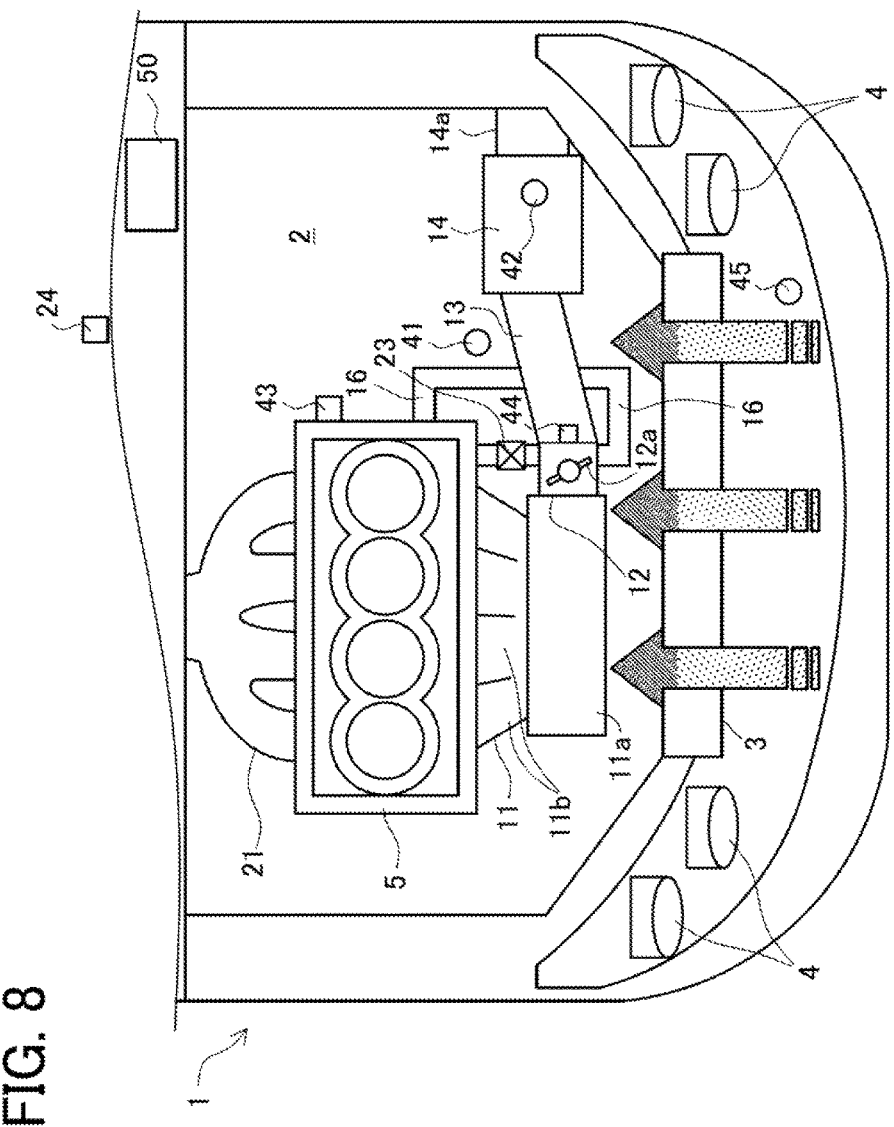
FIG. 8 is a plan view schematically showing the vehicle front part, from which the bonnet has been removed, in the third embodiment.

FIGS. 7 and 8 are plan views schematically showing the front part of the vehicle 1 from which a bonnet has been removed. This third embodiment differs from the first and second embodiments in the following points. Specifically, the hot water passage 16 is provided therein with a hot water control valve 23 made up of a motor-operated valve. This hot water control valve 23 is configured to open and close a valve element (not shown) by a motor 23a (see FIG. 9) driven by energization in order to control a flow of hot water in the hot water passage 16. The motor 23a corresponds to the drive part and the electric motor of the present invention. As shown in FIGS. 7 and 8, in the engine compartment 2, there is provided an engine compartment temperature sensor 41 to detect the internal temperature of the engine compartment 2 as an engine compartment temperature THEC. This sensor 41 corresponds to one example of an engine compartment temperature detecting unit of the present invention. The air cleaner 14 is provided with an intake air temperature (IAT) sensor 42 to detect a temperature of intake air flowing in the air cleaner 14 as an intake air temperature THA. The intake air temperature sensor 42 corresponds to one example of an intake air temperature detecting unit of the present invention. The engine 5 is provided with a water temperature sensor 43 to detect the temperature THW of cooling water ("cooling water temperature") flowing in the engine 5. Since the cooling water flows in the hot water passage 16, the water temperature sensor 43 corresponds to one example of a hot water temperature detecting unit of the present invention. The throttle device 12 is provided with a throttle temperature sensor 44 to detect the temperature of the casing of the throttle device 12 as a throttle temperature THR. This throttle temperature sensor 44 corresponds to one example of an accessory device temperature detecting unit of the present invention. Furthermore, outside in front of the radiator 3, an outside air temperature (OAT) sensor 45 is provided to detect the temperature of outside air ("outside air temperature") THOA. This outside air temperature sensor 45 corresponds to one example of an outside air temperature detecting unit of the present invention. At a driver's side in the vehicle 1, an alarm lamp 24 is further provided to inform of the abnormality of the hot water control valve 23. The vehicle 1 is provided with an electronic control unit (ECU) 50 to control the hot water control valve 23 based on detection values of the sensors 41 to 45.

Figure 9:
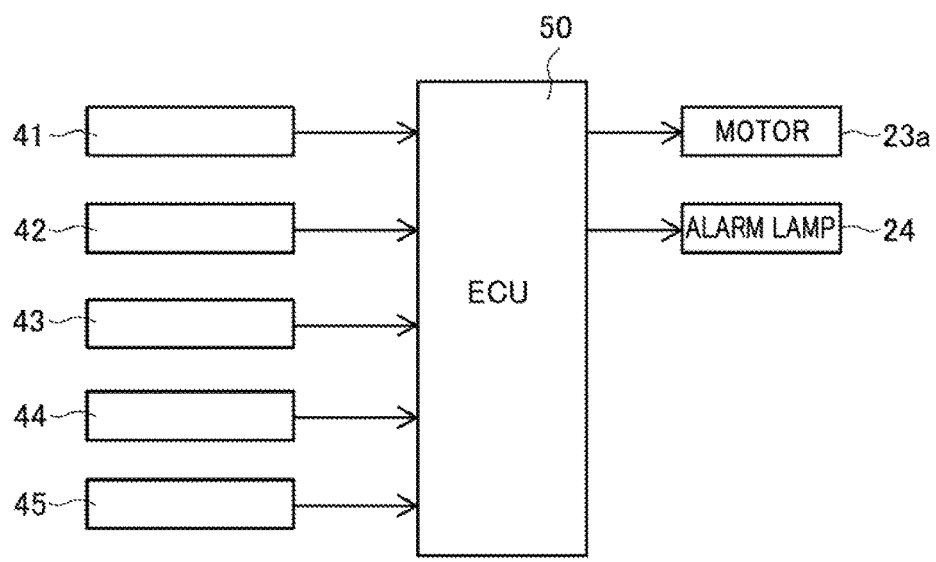
FIG. 9 is a block diagram showing an electrical structure of an apparatus for heating an intake system by hot water in the third embodiment.

FIG. 9 is a block diagram showing an electrical structure of the intake-system hot water heating apparatus in the present embodiment. An input side of the ECU 50 is connected with the engine compartment temperature sensor 41, intake air temperature sensor 42, water temperature sensor 43, throttle temperature sensor 44, and outside air temperature sensor 45. An output side of the ECU 50 is connected with the motor 23a of the hot water control valve 23 and the alarm lamp 24. The ECU 50 corresponds to one example of a control unit of the present invention and is configured to control the hot water control valve 23 based on the detected engine compartment temperature THEC to execute hot water heating control.

Figure 10:
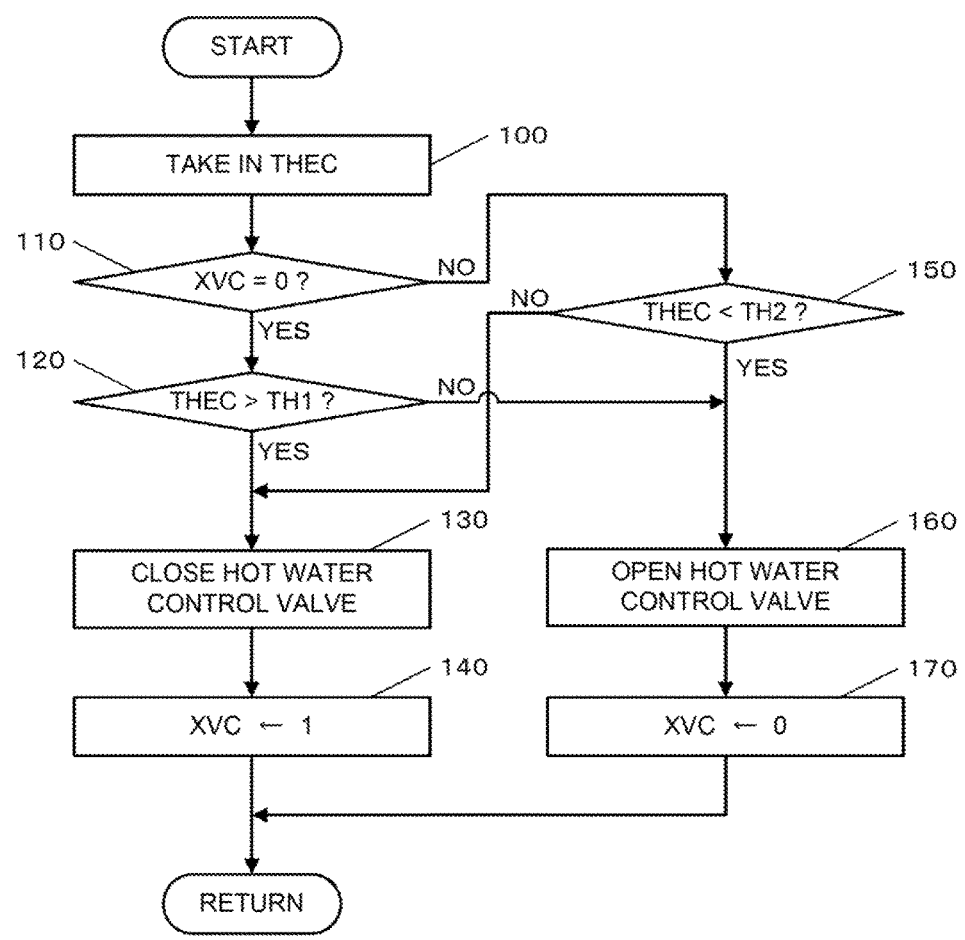
FIG. 10 is a flowchart showing contents of hot water heating control in the third embodiment.

Next, the hot water heating control to be executed by the ECU 50 will be explained. FIG. 10 is a flowchart showing contents of this hot water heating control. When the processing shifts to this routine, in step 100, the ECU 50 takes in (retrieves) the engine compartment temperature THEC based on a detection value of the engine compartment temperature sensor 41.

In step 110, the ECU 50 determines whether a valve-closing flag XVC is "0". This valve-closing flag XVC is set to "0" when the hot water control valve 23 is opened and alternatively to "1" when the hot water control valve 23 is closed. If a determination result in step 110 is affirmative (YES), the ECU 50 shifts the processing to step 120. If the determination result in step 110 is negative (NO), on the other hand, the ECU 50 shifts the processing to step 150.

In step 120, the ECU 50 determines whether the engine compartment temperature THEC is higher than a first predetermined value TH1. Herein, the first predetermined value TH1 can be applied with "35° C.", for example. If a determination result is affirmative in step 120, the ECU 50 advances the processing to step 130. If the determination result is negative in step 120, on the other hand, the ECU 50 shifts the processing to step 160.

In step 130, the ECU 50 controls the motor 23a to close the hot water control valve 23. This shuts off the flow of hot water in the hot water passage 16.

In step 140, subsequently, the ECU 50 sets the valve-closing flag XVC to "1" and returns the processing to step 100.

On the other hand, in step 150 subsequent to step 110, the ECU 50 determines whether the engine compartment temperature THEC is lower than a second predetermined value TH2 (TH2<TH1). Herein, the second predetermined value TH2 can be applied with "30° C.", for example. If a determination result in step 150 is affirmative, the ECU 50 advances the processing to step 160. If the determination result in step 150 is negative, the ECU 50 shifts the processing to step 130.

In step 160 subsequent to step 150 or step 120, the ECU 50 controls the motor 23a to open the hot water control valve 23, thereby allowing the hot water to flow through the hot water passage 16.

Thereafter, in step 170, the ECU 50 sets the valve-closing flag XVC to "0" and returns the processing to step 100.

According to the foregoing hot water heating control, for instance, during an outside air low-temperature period and after completion of warm-up of the engine 5, the internal temperature of the engine compartment 2 decreases due to cold running wind passing through the radiator 3 in association with the running of the vehicle 1. At that time, when the detected engine compartment temperature THEC becomes lower than the second predetermined value TH2, the hot water control valve 23 is opened, allowing the hot water to flow through the hot water passage 16 as indicated by arrows in FIG. 7, thereby heating the throttle device 12. On the other hand, during the outside air normal temperature period and after completion of warm-up of the engine 5, in FIG. 8, the internal temperature of the engine compartment 2 rises due to warm running wind passing through the radiator 3 in association with the running of the vehicle 1. At that time, when the detected engine compartment temperature THEC becomes higher than the first predetermined value TH1, the hot water control valve 23 is closed, shutting off the flowing or circulation of hot water through the hot water passage 16, thereby stopping heating the throttle device 12.

According to the intake-system hot water heating apparatus of a vehicle engine in the present embodiment explained above, different from each of the temperature sensitive type hot water control valves 17 and 20 in the above-mentioned embodiments, the motor 23a is accurately controlled by the ECU 50 based on the engine compartment temperature THEC detected by the engine compartment temperature sensor 41, and thus the hot water control valve 23c can be appropriately opened or closed. Accordingly, as in each of the foregoing embodiments, the throttle device 12 provided in the intake system can be stably heated as needed by the hot water warmed by cooling the engine 5, without causing hunching. In addition, the control accuracy of the hot water control valve 23 with respect to the internal temperature of the engine compartment 2 can be improved.

Fourth Embodiment

A fourth embodiment of the apparatus for heating an intake system of a vehicle engine by hot water according to the present invention will be explained in detail, referring to the accompanying drawings.

Figure 11:
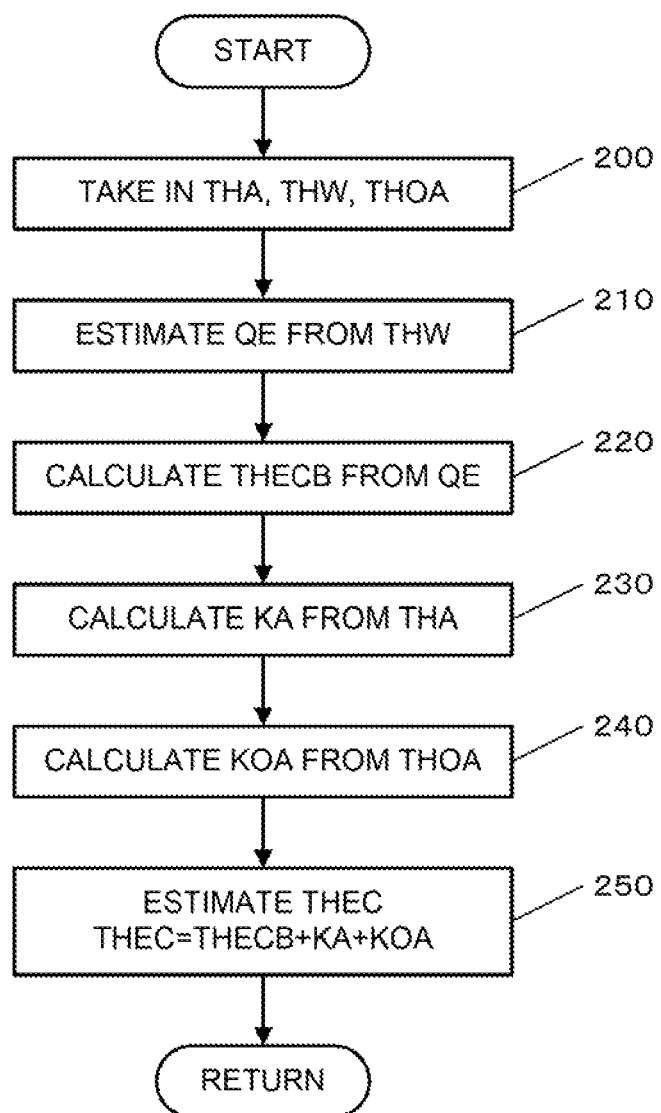
FIG. 11 is a flowchart showing contents of engine compartment temperature estimation processing in a fourth embodiment.

The fourth embodiment differs from the third embodiment in the following points. Specifically, in the present embodiment, the engine compartment temperature sensor 41 shown in FIGS. 7 to 9 are eliminated and instead the engine compartment temperature THEC is estimated according to the operating conditions of the engine 5. FIG. 11 is a flowchart showing contents of estimation processing.

When the processing shifts to this routine, in step 200, the ECU 50 takes in an intake air temperature THA, a cooling water temperature THW, and an outside air temperature THOA respectively based on detection values of the intake air temperature sensor 42, the water temperature sensor 43, and the outside air temperature sensor 45. Herein, the cooling water temperature THW is taken as corresponding to the hot water temperature in the hot water passage 16.

In step 210, the ECU 50 then estimates a heat quantity (engine heat quantity) QE generated by the engine 5 from the taken cooling water temperature THW. The ECU 50 can estimate this engine heat quantity QE by referring to heat quantity data previously experimentally obtained on the engine 5.

In step 220, the ECU 50 then calculates a basic engine compartment temperature THECB from the estimated engine heat quantity QE. The ECU 50 can calculate this basic engine compartment temperature THECB by referring to temperature data previously experimentally obtained.

In step 230, subsequently, the ECU 50 calculates an intake air temperature correction value KA from the taken intake air temperature THA. The ECU 50 can calculate this intake air temperature correction value KA by referring to correction value data previously experimentally obtained.

In step 240, the ECU 50 calculates an outside air temperature correction value KOA from the taken outside air temperature THOA. The ECU 50 can calculate this outside air temperature correction value KOA by referring to correction value data previously experimentally obtained.

In step 250, the ECU 50 then estimates an engine compartment temperature THEC based on the following equation (1) and returns the processing to step 200:

$$THEC=THECB+KA+KOA \tag{Eq. 1}$$

The ECU 50 further reflects the engine compartment temperature THEC estimated as above in the hot water heating control shown in FIG. 10.

According to the intake-system hot water heating apparatus of a vehicle engine in the present embodiment explained above, the internal temperature of the engine compartment 2 is estimated as the engine compartment temperature THEC by the ECU 50 based on the detected intake air temperature THA, cooling water temperature THW (hot water temperature), and outside air temperature THOA. The motor 23a is precisely controlled by the ECU 50 based on the estimated engine compartment temperature THEC and accordingly the hot water control valve 23 is properly opened and closed. Consequently, the present embodiment, differently from the third embodiment, does not need to provide the engine compartment temperature sensor 41 used exclusively for detection of the engine compartment temperature THEC. In this respect, the structure of the intake-system hot water heating apparatus can be more simplified than that in the third embodiment.

Fifth Embodiment

A fifth embodiment of the apparatus for heating an intake system for an engine of a vehicle by hot water according to the present invention will be explained in detail, referring to the accompanying drawings.

Figure 12:
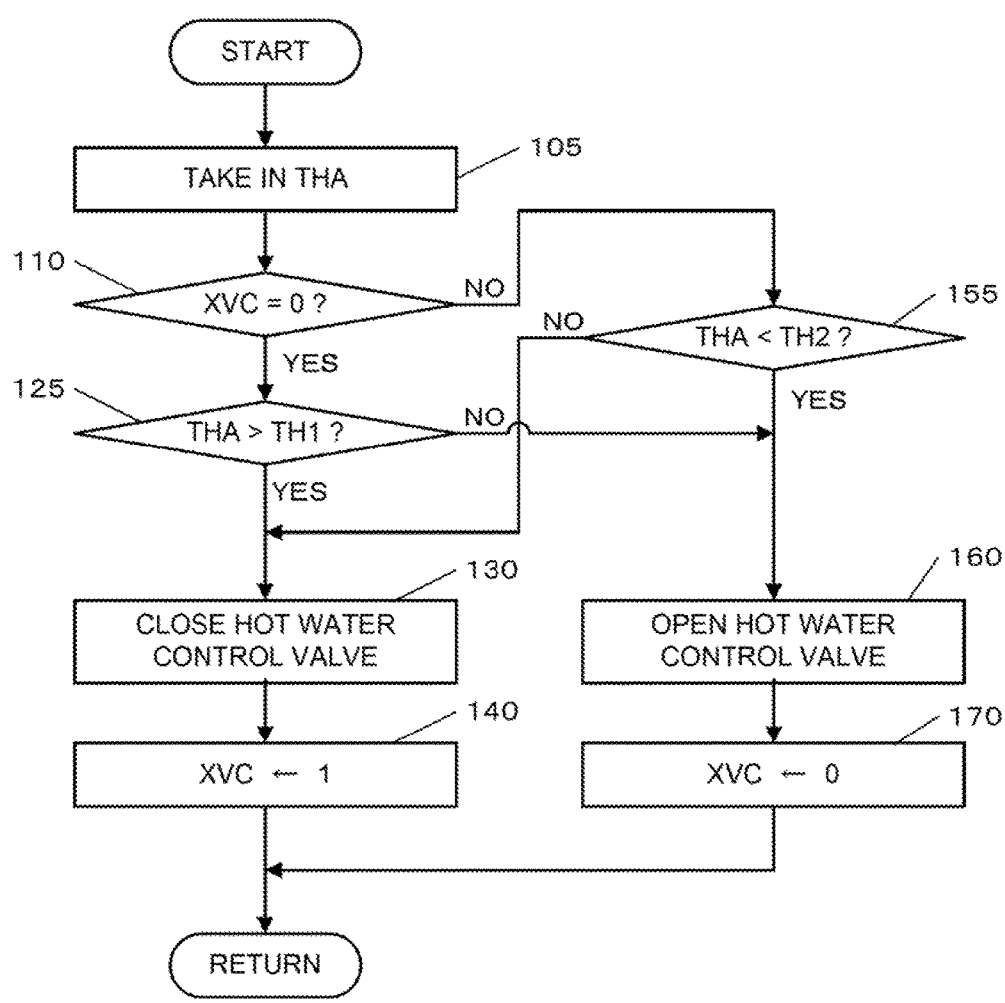
FIG. 12 is a flowchart showing contents of hot water heating control in a fifth embodiment.

The fifth embodiment differs from the third and fourth embodiments in the following points. Specifically, in the fifth embodiment, the engine compartment temperature sensor 41 shown in FIGS. 7 to 9 is eliminated and instead the ECU 50 executes hot water heating control based on the intake air temperature THA. FIG. 12 is a flowchart showing contents of the hot water heating control.

This flowchart is different in contents in steps 105, 125, and 155 from the contents in steps 100, 120, and 150 in the flowchart in FIG. 10. In step 105 instead of step 100, specifically, the ECU 50 takes in an intake air temperature THA based on a detection value of the intake air temperature sensor 42. In step 125 instead of step 120, the ECU 50 determines whether the intake air temperature THA is higher than the first predetermined value TH1. In step 155 instead of step 150, the ECU 50 determines whether the intake air temperature THA is lower than the second predetermined value TH2 (TH2<TH1). Other processing contents in this flowchart are the same as those in the flowchart in FIG. 10.

In the intake-system hot water heating apparatus of a vehicle engine in the present embodiment explained above, the ECU 50 is configured to control the motor 23*a* based on the intake air temperature THA detected by the intake air temperature sensor 42 to open and close the hot water control valve 23. In general, the temperature of intake air in an intake passage is influenced by the heat inside of an engine compartment and therefore correlates to the temperature of the engine compartment. Accordingly, the motor 23*a* is accurately controlled by the ECU 50 based on the detected intake air temperature THA and the hot water control valve 23 is properly opened and closed. Also in the present embodiment, accordingly, there is no need to provide the engine compartment temperature sensor 41 exclusively used for detecting the engine compartment temperature THEC and thus the structure of the intake-system hot water heating apparatus can be more simplified than in the third embodiment.

Sixth Embodiment

A sixth embodiment of the apparatus for heating an intake system for an engine of a vehicle by hot water according to the present invention will be explained below, referring to the accompanying drawings.

Figure 13:
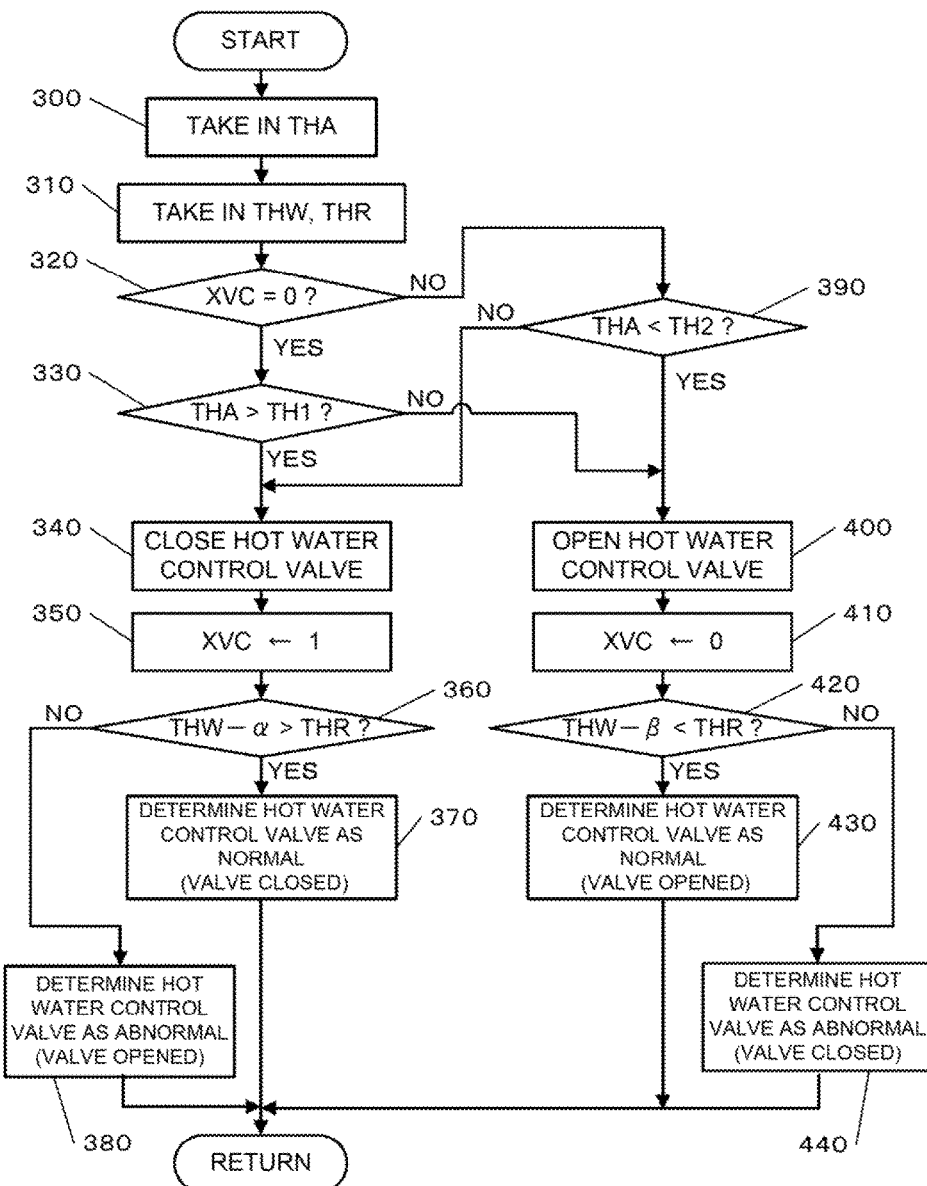
FIG. 13 is a flowchart showing contents of hot water heating control in a sixth embodiment.

The sixth embodiment differs in contents of the hot water heating control from the third to fifth embodiments. In the sixth embodiment, specifically, the engine compartment temperature sensor 41 shown in FIGS. 7 to 9 is eliminated and instead the ECU 50 executes the hot water heating control shown in a flowchart in FIG. 13.

When the processing shifts to this routine, in step 300, the ECU 50 takes in an intake air temperature THA based on a detection value of the intake air temperature sensor 42.

In step 310, the ECU 50 takes in a cooling water temperature THW and a throttle temperature THR respectively based on detection values of the water temperature sensor 43 and the throttle temperature sensor 44. Herein, the cooling water temperature THW corresponds to the hot water temperature in the hot water passage 16 and the water temperature sensor 43 corresponds to a hot water temperature detecting unit of the present invention. The throttle temperature THR corresponds to an accessory device temperature of the present invention and the throttle temperature sensor 44 corresponds to an accessory device temperature detecting unit of the present invention.

In step 320, subsequently, the ECU 50 determines whether the valve-closing flag XVC is "0". If a determination result in step 320 is affirmative, the ECU 50 advances the processing to step 330. On the other hand, if the determination result in step 320 is negative, the ECU 50 shifts the processing to step 390.

In step 330, the ECU 50 determines whether the intake air temperature THA is higher than the first predetermined value TH1. If a determination result in step 330 is affirmative, the ECU 50 advances the processing to step 340. If the determination result in step 330 is negative, the ECU 50 shifts the processing to step 400.

In step 340, the ECU 50 closes the hot water control valve 23, thereby shutting off the flow of hot water through the hot water passage 16. In step 350, the ECU 50 then sets the valve-closing flag XVC to "1".

In step 360, the ECU 50 determines whether a temperature (THW-α) obtained by subtracting a predetermined value α from the cooling water temperature THW is higher than the throttle temperature THR. If an affirmative result is obtained in step 360, the ECU 50 advances the processing to step 370. If a negative result is obtained in step 360, on the other hand, the ECU 50 shifts the processing to step 380.

In step 370, the ECU 50 judges the hot water control valve 23 as being normally closed in accordance with a command (Normality determination) and returns the processing to step 300. The ECU 50 can store this determination result in a built-in memory.

On the other hand, in step 380, the ECU 50 judges the hot water control valve 23 as being abnormally opened against the command (Abnormality determination) and returns the processing to step 300. Herein, the ECU 50 can store this determination result in the built-in memory. The ECU 50 can also blink the alarm lamp 24 to inform of this abnormality.

On the other hand, in step 390 subsequent to step 320, the ECU 50 determines whether the intake air temperature THA is lower than the second predetermined value TH2 (TH2<TH1). If the determination result in step 390 is affirmative, the ECU 50 advances the processing to step 400). If the determination result in step 390 is negative, the ECU 50 shifts the processing to step 340.

In step 400 subsequent to step 390 or 330, the ECU 50 controls the motor 23*a* to open the hot water control valve 23, thereby allowing the hot water to flow through the hot water passage 16. In step 410, thereafter, the ECU 50 sets the valve-closing flag XVC to "0".

In step 420, the ECU 50 then determines whether a temperature (THW-β) obtained by subtracting a predetermined value β (α>β) from the cooling water temperature THW is lower than the throttle temperature THR. If an affirmative result is obtained in step 420, the ECU 50 advances the processing to step 430. If a negative result is obtained in step 420, the ECU 50 shifts the processing to step 440.

In step 430, the ECU 50 judges the hot water control valve 23 as being normally opened in accordance with a command (Normality determination) and returns the processing to step 300. The ECU 50 can store this determination result in the built-in memory.

On the other hand, in step 440, the ECU 50 judges the hot water control valve 23 as being abnormally closed against the command (Abnormality determination) and returns the processing to step 300. Herein, the ECU 50 can store this determination result in the built-in memory. The ECU 50 also can blink the alarm lamp 24 to inform of this abnormality.

In the present embodiment, the ECU 50 corresponds to one example of an abnormality determining unit to determine the abnormality of the hot water control valve 23. The ECU 50 is thus configured to determine whether the hot water control valve 23 is abnormal or not based on a temperature difference between the cooling water temperature THW and the throttle temperature THR which are detected when the hot water control valve 23 is opened or closed.

According to the intake-system hot water heating apparatus of a vehicle engine in the present embodiment explained as above, the following operations and advantages can be achieved in addition to the operations and advantages of the fifth embodiment. Specifically, whether the hot water control valve 23 is abnormal or not is determined by the ECU 50 based on the temperature difference between the cooling water temperature THW (hot water temperature) detected by the water temperature sensor 43 and the throttle temperature THR detected by the throttle temperature sensor 44 when the hot water control valve 23 is opened or closed. From this determination result showing that the hot water control valve 23 is abnormal, a driver can early know the occurrence of failure or trouble in the hot water control valve 23. Accordingly, the driver can promptly address the failure or trouble in the hot water control valve 23 and further prevent the occurrence of secondary failure or trouble in the engine 5.

For instance, in case the hot water control valve 23 is failed with the valve element staying stuck in the valve-open state, high-temperature hot water is likely to be circulated around the throttle device 12 even after completion of warm-up of the engine 5, thus heating the intake air passing through the throttle device 12. This may lead to a decrease in air density in the combustion chamber, resulting in deteriorated fuel combustion quality or performance, and further cause secondary failures in the engine 5 such as deteriorated knocking, decreased torque, and lowered fuel economy. On the other hand, in case the hot water control valve 23 is failed with the valve element staying struck in the valve-closed state, secondary failures or troubles may be caused; e.g., condensed water may occur in the throttle device 12 and the intake pipe 13, and the throttle valve 12a may be stuck due to freezing of the condensed water. According to the present embodiment, it is possible to early address the above-mentioned failures or troubles of the hot water control valve 23 and further prevent the occurrence of the exemplified secondary failures or troubles.

The present invention is not limited to each of the foregoing embodiments and may be embodied in other specific forms without departing from the essential characteristics thereof.

In the first embodiment, the expanding-contracting member 18 provided in the hot water control valve 17 is a component made of shape-memory alloy in a coil form, but it may be made of a plate-shaped or rod-shaped shape-memory alloy.

In the first and second embodiments, the flange member 31 is made up of the heat insulating member. As an alternative, the flange member 31 may be constituted of a non-heat insulating member.

In each of the foregoing embodiments, the throttle device 12 is assumed as an accessory device provided in relation to the intake passage. As this accessory device, a mixer before a compressor of a supercharger, an ISC valve for idle rotation control, an EGR valve provided near the intake passage, and others may be assumed.

INDUSTRIAL APPLICABILITY

The present invention is applicable to a vehicle such as a car or the like in which an engine is placed in a front-side engine compartment.

REFERENCE SIGNS LIST

1 Vehicle
2 Engine compartment
3 Radiator
5 Engine
11 Intake manifold (Intake passage)
12 Throttle device (Intake passage, Accessory device)
13 Intake pipe (Intake passage)
14 Air cleaner (Intake passage)
16 Hot water passage
17 Hot water control valve
17B Drive part
18 Expanding-contracting member
19 Spring (Drive part)
20 Hot water control valve
23 Hot water control valve
23a Motor (Drive part, Electric motor)
26 Valve element
31 Flange member (Heat insulating member)
33 Spring (Drive part)
36 Expanding-contracting member
41 Engine compartment temperature sensor (Engine compartment temperature detecting unit)
42 Intake air temperature sensor (Intake air temperature detecting unit)
43 Water temperature sensor (Hot water temperature detecting unit)
44 Throttle temperature sensor (Accessory device temperature detecting unit)
45 Outside air sensor (Outside air temperature detecting unit)
50 ECU (Valve control unit, Abnormality determining unit)

What is claimed is:

1. An apparatus for heating an intake system for an engine of a vehicle by hot water, the vehicle having an engine compartment placed in a front part, in which a radiator is placed on a front side, and the engine and the intake system are placed behind the radiator, wherein the intake system includes an intake passage to introduce air into the engine and an accessory device provided in connection with the intake passage, the apparatus comprising:

a hot water passage configured to allow hot water warmed by cooling the engine to circulate around the accessory device to heat the accessory device;

a hot water control valve configured to control a flow of the hot water in the hot water passage, the hot water control valve having a drive part including an electric motor configured to drive a valve element to open and close;

an engine compartment temperature detector configured to detect an internal temperature of the engine compartment as an engine compartment temperature;

a hot water temperature detector configured to detect a hot water temperature in the hot water passage;

an accessory device temperature detector configured to detect a temperature of the accessory device as an accessory device temperature; and a control unit configured to:
control the electric motor of the hot water control valve to open and close according to the internal temperature of the engine compartment; and
determine an abnormality of the hot water control valve based on a temperature difference between the hot water temperature and the accessory device temperature detected when the hot water control valve is opened or closed.

2. The apparatus for heating an intake system for an engine of a vehicle by hot water according to claim 1, wherein
the control unit includes an expanding-contracting member configured to expand or contract in response to the internal temperature of the engine compartment to control operations of the drive part.

3. The apparatus for heating an intake system for an engine of a vehicle by hot water according to claim 2, wherein the expanding-contracting member is made of shape-memory alloy.

4. The apparatus for heating an intake system for an engine of a vehicle by hot water according to claim 2, further including a heat insulating member between the drive part and the expanding-contracting member.

5. The apparatus for heating an intake system for an engine of a vehicle by hot water according to claim 3, further including a heat insulating member between the drive part and the expanding-contracting member.

6. The apparatus for heating an intake system for an engine of a vehicle by hot water according to claim 2, further including:
an intake air temperature detector configured to detect an intake air temperature in the intake passage; and
an outside air temperature detector configured to detect an outside air temperature outside the vehicle,
wherein the control unit is an electronic control unit configured to estimate the internal temperature of the engine compartment as the engine compartment temperature based on the detected intake air temperature, hot water temperature, and outside air temperature, and control the electric motor.

7. The apparatus for heating an intake system for an engine of a vehicle by hot water according to claim 2, further including an intake air temperature detector configured to detect an intake air temperature in the intake passage,
wherein the control unit is an electronic control unit configured to control the electric motor based on the intake air temperature detected by the intake air temperature detector.

8. An apparatus for heating an intake system for an engine of a vehicle by hot water, the vehicle having an engine compartment placed in a front part, in which a radiator is placed on a front side, and the engine and the intake system are placed behind the radiator, wherein the intake system includes an intake passage to introduce air into the engine and an accessory device provided in connection with the intake passage, the apparatus comprising:
a hot water passage configured to allow hot water warmed by cooling the engine to circulate around the accessory device to heat the accessory device;
a hot water control valve configured to control a flow of the hot water in the hot water passage;
a hot water temperature detector configured to detect a hot water temperature in the hot water passage;
an accessory device temperature detector configured to detect a temperature of the accessory device as an accessory device temperature; and
a control unit configured to:
control the hot water control valve to open and close according to an internal temperature of the engine compartment; and
determine an abnormality of the hot water control valve based on a temperature difference between the hot water temperature and the accessory device temperature detected when the hot water control valve is opened or closed.

\* \* \* \* \*